United States Patent
Umekawa et al.

(10) Patent No.: US 9,671,547 B2
(45) Date of Patent: Jun. 6, 2017

(54) ILLUMINATION DEVICE AND DISPLAY DEVICE

(71) Applicant: Sharp Kabushiki Kaisha, Osaka (JP)

(72) Inventors: Ichiro Umekawa, Osaka (JP); Hirofumi Oosawa, Osaka (JP); Takeshi Ishida, Osaka (JP); Ryuzo Yuki, Osaka (JP); Masaki Kageyama, Yonago (JP); Shugo Yagi, Yonago (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 301 days.

(21) Appl. No.: 14/395,895

(22) PCT Filed: Apr. 18, 2013

(86) PCT No.: PCT/JP2013/061532
§ 371 (c)(1),
(2) Date: Oct. 21, 2014

(87) PCT Pub. No.: WO2013/161678
PCT Pub. Date: Oct. 31, 2013

(65) Prior Publication Data
US 2015/0131309 A1 May 14, 2015

(30) Foreign Application Priority Data

Apr. 23, 2012 (JP) ................. 2012-097797

(51) Int. Cl.
*F21V 8/00* (2006.01)

(52) U.S. Cl.
CPC .......... *G02B 6/0053* (2013.01); *G02B 6/0011* (2013.01); *G02B 6/0038* (2013.01); *G02B 6/0073* (2013.01)

(58) Field of Classification Search
CPC .. G02B 6/0016; G02B 6/0033; G02B 6/0035; G02B 6/0036; G02B 6/0038
(Continued)

(56) References Cited

U.S. PATENT DOCUMENTS

| 5,851,062 A | * | 12/1998 | Shinohara | ............ | G02B 6/0053 |
| | | | | | 362/23.15 |
| 7,537,372 B2 | * | 5/2009 | Sugimoto | ............ | G02B 6/0055 |
| | | | | | 362/617 |

(Continued)

FOREIGN PATENT DOCUMENTS

| CN | WO2011065052 A1 * | 6/2011 | .......... G02B 6/0016 |
| JP | 2009-134989 A | 6/2009 | |

(Continued)

*Primary Examiner* — Andrew Coughlin
*Assistant Examiner* — Colin Cattanach
(74) *Attorney, Agent, or Firm* — Chen Yoshimura LLP

(57) ABSTRACT

Provided are an illumination device capable of improving the uniformity in brightness of the illumination light, and a display device using the same. An illumination device is provided with: a plurality of light sources arranged in a row in one direction; and a light guide plate which has, along a side edge face, a light receiving face facing the light source, guides light entering through the light receiving face, and outputs illumination light from a light emitting surface disposed on the front surface; the light guide plate having a plurality of prisms and a plurality of prisms provided in an indented manner on the front or rear surface and arranged in a row along the longitudinal direction of the light receiving face; the prisms being formed spanning between the light receiving face and the opposing face opposite the light receiving face; and the prisms being formed, between adjacent prisms, deeper than the prisms within a predetermined range in the vicinity of the light receiving face.

6 Claims, 11 Drawing Sheets

(58) Field of Classification Search
USPC .................................................. 362/620, 626
See application file for complete search history.

(56) References Cited

U.S. PATENT DOCUMENTS

| | | | | |
|---|---|---|---|---|
| 7,697,813 B2* | 4/2010 | Lee | ................ | G02B 6/0038 362/615 |
| 2004/0085749 A1* | 5/2004 | Parker | ................ | F21V 5/00 362/601 |
| 2004/0264911 A1* | 12/2004 | Toeda | ................ | G02B 6/0016 385/146 |
| 2005/0002174 A1* | 1/2005 | Min | ................ | G02B 6/0038 362/609 |
| 2005/0180169 A1* | 8/2005 | Saitoh | ................ | G02B 6/0038 362/620 |
| 2005/0243575 A1* | 11/2005 | Kunimochi | ................ | G02B 6/0038 362/606 |
| 2006/0209563 A1* | 9/2006 | Hirota | ................ | G02B 6/0016 362/608 |
| 2007/0147086 A1* | 6/2007 | Hsu | ................ | G02B 6/0036 362/615 |
| 2008/0151577 A1* | 6/2008 | Li | ................ | G02B 6/0016 362/620 |
| 2008/0285309 A1* | 11/2008 | Fang | ................ | G02B 6/0016 362/620 |
| 2009/0086509 A1* | 4/2009 | Omori | ................ | G02B 6/0036 362/628 |
| 2009/0167641 A1* | 7/2009 | Kim | ................ | G02B 6/0038 345/60 |
| 2010/0027294 A1* | 2/2010 | Lee | ................ | G02B 5/045 362/620 |
| 2010/0328576 A1* | 12/2010 | Kinoshita | ................ | G02B 6/0038 349/62 |
| 2011/0019437 A1* | 1/2011 | Liao | ................ | G02B 6/0061 362/615 |
| 2012/0134175 A1* | 5/2012 | Kunimasa | ................ | G02B 6/0016 362/602 |

FOREIGN PATENT DOCUMENTS

| | | |
|---|---|---|
| WO | 2004/081444 A1 | 9/2004 |
| WO | 2011/065052 A1 | 6/2011 |

* cited by examiner

ILLUMINATION DEVICE AND DISPLAY DEVICE

TECHNICAL FIELD

The present invention relates to an illumination device provided with a light guide plate and a display device using this illumination device.

BACKGROUND ART

A conventional illumination device used in a liquid crystal display device or the like is disclosed in Patent Document 1. This illumination device is provided with a plurality of light sources and a light guide plate that guides light from the light sources that has entered the light guide plate and emits illumination light. The light sources are LEDs (light emitting diodes) and are arranged in one direction.

The light guide plate is resin-molded and has a substantially rectangular shape in a plan view, and has a light receiving face on a side face facing the light source and an illumination light emitting surface on a front surface thereof. On the rear surface of the light guide plate, a plurality of inclined faces that are inclined towards the light receiving face extend along the lengthwise direction of the light receiving face and are arranged in the optical axis direction of the light sources.

A plurality of prisms that extend along the optical axis direction of the light source are recessed into the light emitting surface, which is the front surface of the light guide plate. The prisms are arranged at a prescribed pitch in the lengthwise direction of the light receiving face, and a cross-sectional shape of the prisms parallel to the lengthwise direction of the light receiving face is formed in a trapezoid shape.

If the illumination device is driven, the light emitted from the light sources enters the light guide plate through the light receiving face. The light that entered the light guide plate is reflected by the light emitting surface and the rear surface of the light guide plate and is guided in the optical axis direction of the light sources. At this point, the light guided by the light guide plate and that has reached the prisms is diffused in the lengthwise direction of the light receiving face and reflected. Furthermore, the light guided by the light guide plate has a small incident angle at the light emitting surface due to reflection at the inclined faces of the rear surface, and therefore, as the light is repeatedly reflected, the light that is incident on the light emitting surface with a smaller incident angle than the critical angle is emitted. As a result, the illumination light is diffused in the optical axis direction of the light source and in the lengthwise direction of the light receiving face and is emitted from the light emitting surface.

RELATED ART DOCUMENTS

Patent Documents

Patent Document 1: Japanese Patent Application Laid-Open Publication No. 2009-134989 (pages 4-6, FIGS. 1 and 2)

SUMMARY OF THE INVENTION

Problems to be Solved by the Invention

However, according to the conventional illumination device, the light that is guided by the light guide plate is diffused in the lengthwise direction of the light receiving face by the reflection of the prism, and thus, the light reflected by the prism is intensified between the adjacent light sources in the vicinity of the light receiving face where the amount of light is high. As a result, a bright line (V-shaped bright line) of light emitted at a high luminance occurs between the adjacent light sources. Therefore, there was a problem in that the luminance of the illumination light emitted from the light emitting surface could not be made uniform.

The object of the present invention is to provide an illumination device that can improve the uniformity of the luminance of the illumination light and to provide a display device using this illumination device.

Means for Solving the Problems

In order to achieve the above-mentioned object, the present invention includes: a plurality of light sources arranged in one direction; and a light guide plate that has a side edge face as a light-receiving face facing the light sources and that guides light from the light sources received through the light-receiving face so as to emit illumination light from a light-emitting surface that is a front surface of the light guide plate, wherein a plurality of first concave prisms and a plurality of second concave prisms are formed so as to be recessed from the front surface or a rear surface of the light guide plate, the first concave prisms and the second concave prisms being arranged along a lengthwise direction of the light-receiving face, and wherein the first concave prisms extend from the light-receiving face to a face of the light guide plate opposite thereto, and the second concave prisms extend from the light-receiving face and are truncated in a prescribed area in a vicinity of the light-receiving face, the second concave prisms respectively being formed between the adjacent first concave prisms and recessed deeper than the first concave prisms.

According to this configuration, the light emitted from the light source enters the light guide plate through the light receiving face. The light that has entered the light guide plate is guided by being reflected by the light emitting surface and the rear surface of the light guide plate. At this point, the light guided by the light guide plate and that has reached the first prisms is diffused in the lengthwise direction of the light receiving face and reflected. Then, a portion of the light that is reflected by the first prism is reflected by the second prism and returns to the area of the light guide plate facing the light source. The light that is incident on the light emitting surface with an incident angle smaller than the critical angle by repeatedly reflecting the light within the light guide plate is emitted from the light emitting surface.

In the illumination device of the above-mentioned configuration of the present invention, it is preferable that a base angle of the second concave prisms be greater than a base angle of the first concave prisms.

In the illumination device of the above-mentioned configuration of the present invention, it is preferable that a cross-sectional shape of the first concave prisms along a direction parallel to the lengthwise direction of the light-receiving face be curved.

In the illumination device of the above-mentioned configuration of the present invention, it is preferable that a length, in an optical axis direction of the light sources, of the second concave prisms facing the light sources be shorter than a length in the optical axis direction of the second concave prisms between the light sources.

In the illumination device of the above-mentioned configuration of the present invention, it is preferable that the second concave prisms formed in regions of the light guide plate facing the light sources be shallower in depth than the second concave prisms formed in regions of the light guide plate between the regions of the light guide plate facing the adjacent light sources.

In the illumination device of the above-mentioned configuration of the present invention, it is preferable that the light guide plate have formed therein third concave prisms arranged along the optical axis direction of the light sources, each of the third concave prisms having a surface inclined such that a point on the surface is closer to the rear surface of the light guide plate the farther away the point on the surface is from the light-receiving face, that the illumination device further include: a low refractive index layer that is disposed on the rear surface of the light guide plate and that has a lower refractive index than the light guide plate; and a condensing portion having formed therein fourth concave prisms arranged along the optical axis direction, the condensing portion being formed on a rear surface of the low refractive index layer, each of the fourth concave prisms having a surface inclined towards a direction such that a point on the surface becomes closer to the low refractive index layer the farther away the point on the surface is from the light-receiving face, and that the first concave prisms and the second concave prisms be formed in the light-emitting surface and the third concave prisms be respectively formed between each first concave prism and each second concave prism.

According to this configuration, the light emitted from the light source enters the light guide plate through the light receiving face. The light that has entered the light guide portion is guided by being reflected by the rear surface and the light emitting surface on the front surface. The incident angle of the guided light at the light emitting surface and the rear surface of the light guide portion becomes gradually smaller by the light being reflected by the inclined face of the third prism. The light that is incident on the rear surface of the light guide portion at an incident angle smaller than the critical angle enters the low refractive index layer. At this time, the light with an incident angle smaller than the critical angle due to being reflected by the inclined face of the third prism enters the low refractive index layer, and the light with a larger incident angle than the critical angle enters the low refractive index layer once the incident angle is smaller than the critical angle due to being reflected by the inclined faces of the third prisms again. As a result, the incident angle of the light entering the low refractive index layer can be narrowed to a prescribed range according to the inclination angle of the inclined face. The light incident on the low refractive index layer and having a larger incident angle than the critical angle of the inclined face of the fourth prisms is reflected towards the light emitting surface and travels through the light guide portion and is emitted from the light emitting surface. Furthermore, the light that is incident on the inclined faces of the fourth prisms with a smaller incident angle than the critical angle is refracted by the inclined faces of the fourth prisms when being emitted from the condensing portion and reenters the condensing portion. Then, when the incident angle of the light to the inclined face of the fourth prism is larger than the critical angle, the light is reflected in the direction of the light emitting surface.

A display device of the present invention includes: the illumination device of the respective configurations above; and a display panel disposed opposite to the light-emitting surface of the light guide plate.

Effects of the Invention

According to the present invention, the light guide plate is formed in a recess in the front surface or the rear surface and has a plurality of first concave prisms and a plurality of second concave prisms that are arranged in the lengthwise direction of the light receiving face, the first concave prisms extend across the gap between the light receiving face and the opposing face on the side opposite the light receiving face, and the second concave prisms are formed deeper than the first concave prisms in a prescribed area in the vicinity of the light receiving face between the adjacent first prisms. As a result, a portion of the light from the light sources that has reached the first concave prisms from the vicinity of the light receiving face and reflected by the first concave prisms is then reflected by the second concave prisms so as to return to the areas facing the light sources. Therefore, the occurrence of a bright line that has a high luminance in the light emitting surface between the adjacent light sources can be prevented. As a result, the uniformity of the luminance of the illumination light emitted from the light emitting surface can be improved.

DETAILED DESCRIPTION OF EMBODIMENTS

Figure 1:
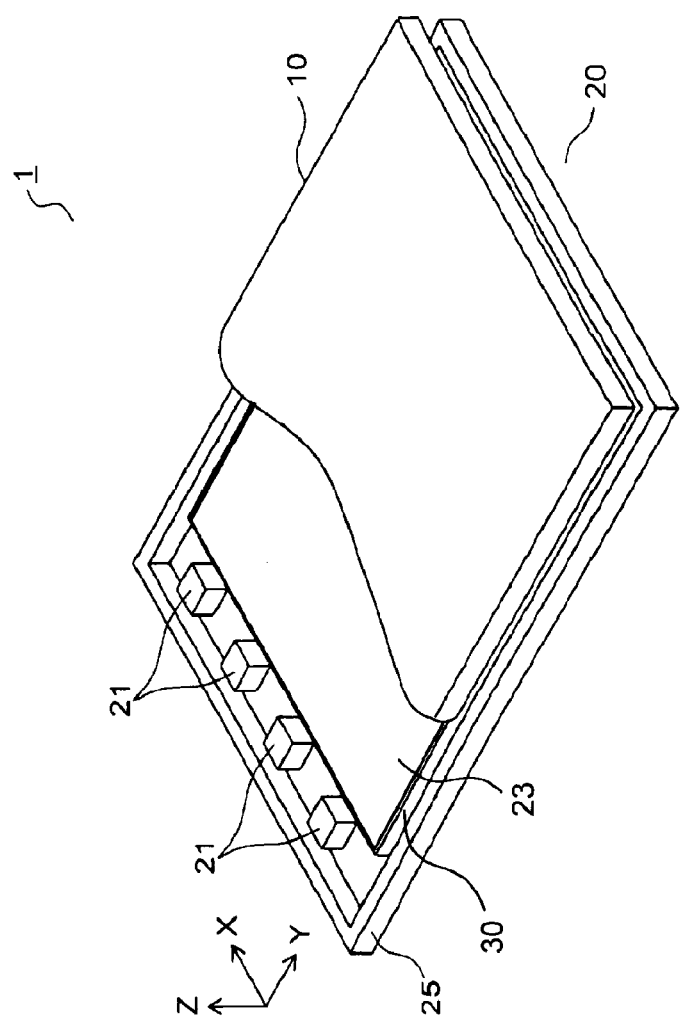
FIG. 1 is a perspective view of the display device of Embodiment 1 of the present invention.
Figure 2:
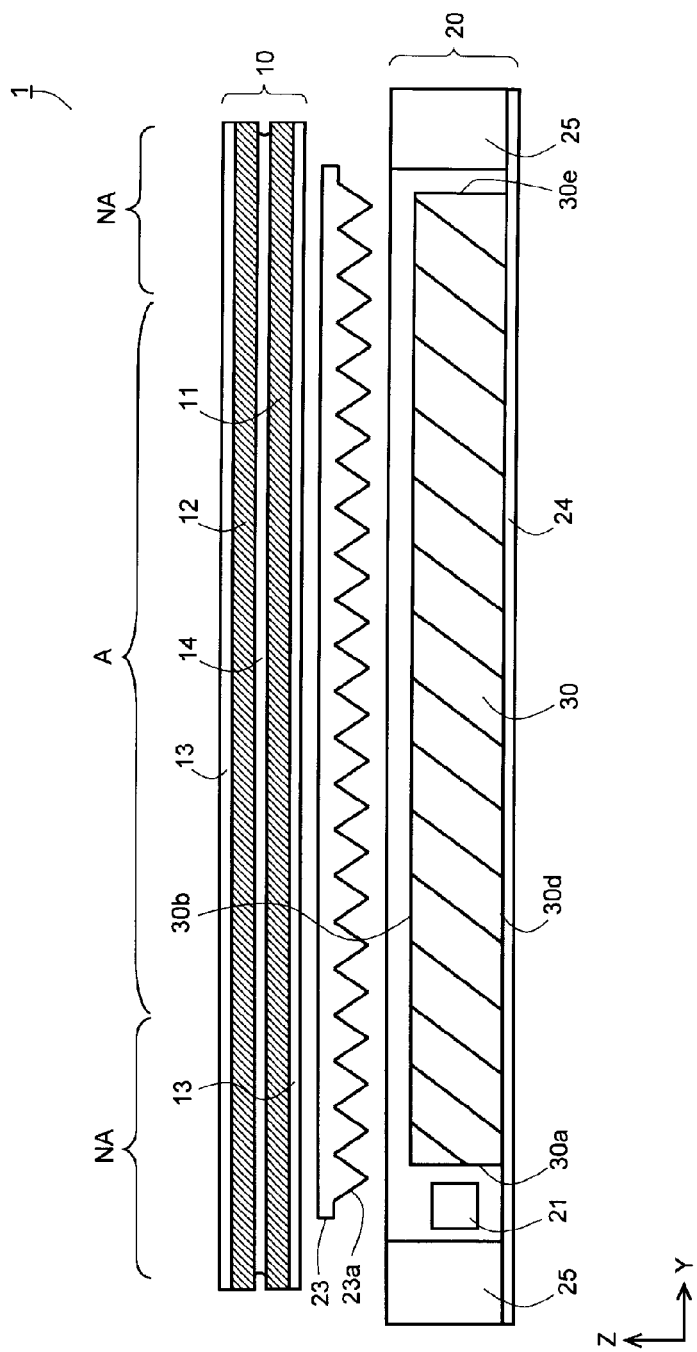
FIG. 2 is a cross-sectional view of the side face showing the display device of Embodiment 1 of the present invention.

Embodiments of the present invention will be explained below with reference to the drawings. FIGS. 1 and 2 are a perspective view and a cross-sectional view of a side face of the display device in Embodiment 1. A display device 1 is provided with a display panel 10 and an illumination device 20. The display panel 10 is a liquid crystal display panel and has an active matrix substrate 11 that includes a switching element such as a thin film transistor (TFT), and an opposite substrate 12 that is opposite to the active matrix substrate 11. A liquid crystal 14 is injected between the active matrix substrate 11 and the opposite substrate 12. Respective polarizing films 13 are disposed on the light receiving surface of the active matrix substrate 11 and the light-emitting surface of the opposite substrate 12.

The liquid crystal panel 10 has a display region A and a non-display region NA. The display region A is a region that displays images, and the non-display region NA is a region that does not display images. The non-display region NA is formed around the display region A.

The illumination device 20 is provided with a case 25, light sources 21, a light guide plate 30, a prism sheet 23 and a reflective member 24 that is in a sheet shape. The case 25 is formed in a frame shape that has an opening in the center portion and houses the light sources 21 and the light guide plate 30. The bottom face of the case 25 is covered by the reflective member 24. The case 25 is formed of a resin molded article or the like. Furthermore, the case 25 may be formed of a light absorbing material such as a resin molded article or the like that includes a black pigment. Furthermore, the case 25 may be formed by applying a light absorbing material formed of black pigment or the like on a substrate made of a resin, a metal, or the like. The light source 21 is an LED (light emitting diode), and a plurality of the light sources 21 are arranged in one direction (X direction).

The light guide plate 30 is formed of a transparent resin or the like to be rectangular in a plan view. The side face of the light guide plate 30 is a light receiving face 30a that faces the light source 21 and that receives the light emitted from the light sources 21, and the front surface that faces the display panel 10 forms a light emitting surface 30b that emits illumination light.

In the description below, the lengthwise direction of the light receiving face 30a is the X direction, the optical axis direction of the light source 21 perpendicular to the X direction is the Y direction, and the emitting direction of the light guide plate 30 perpendicular to the X and Y directions is the Z direction.

The prism sheet 23 is disposed so as to face the light emitting surface 30b of the light guide plate 30, and a plurality of prisms 23a that extend along the X axis and that are arranged along the Y axis are formed on the bottom faces (towards the light guide plate 30) of the plurality of prisms 23a. The cross-sectional shape of the prism 23a is formed to be a substantially isosceles triangle, and the directivity angle of the light emitted from the light emitting surface 30b is narrowed in the direction perpendicular to the edge line (Y direction). As a result, the luminance in front of the light emitting surface 30b can be improved.

The reflective member 24 reflects light emitted from the rear surface 30d of the light guide plate 30 and returns the light to the light guide plate 30. The reflective member 24 can improve the utilization efficiency of light.

Figure 3:
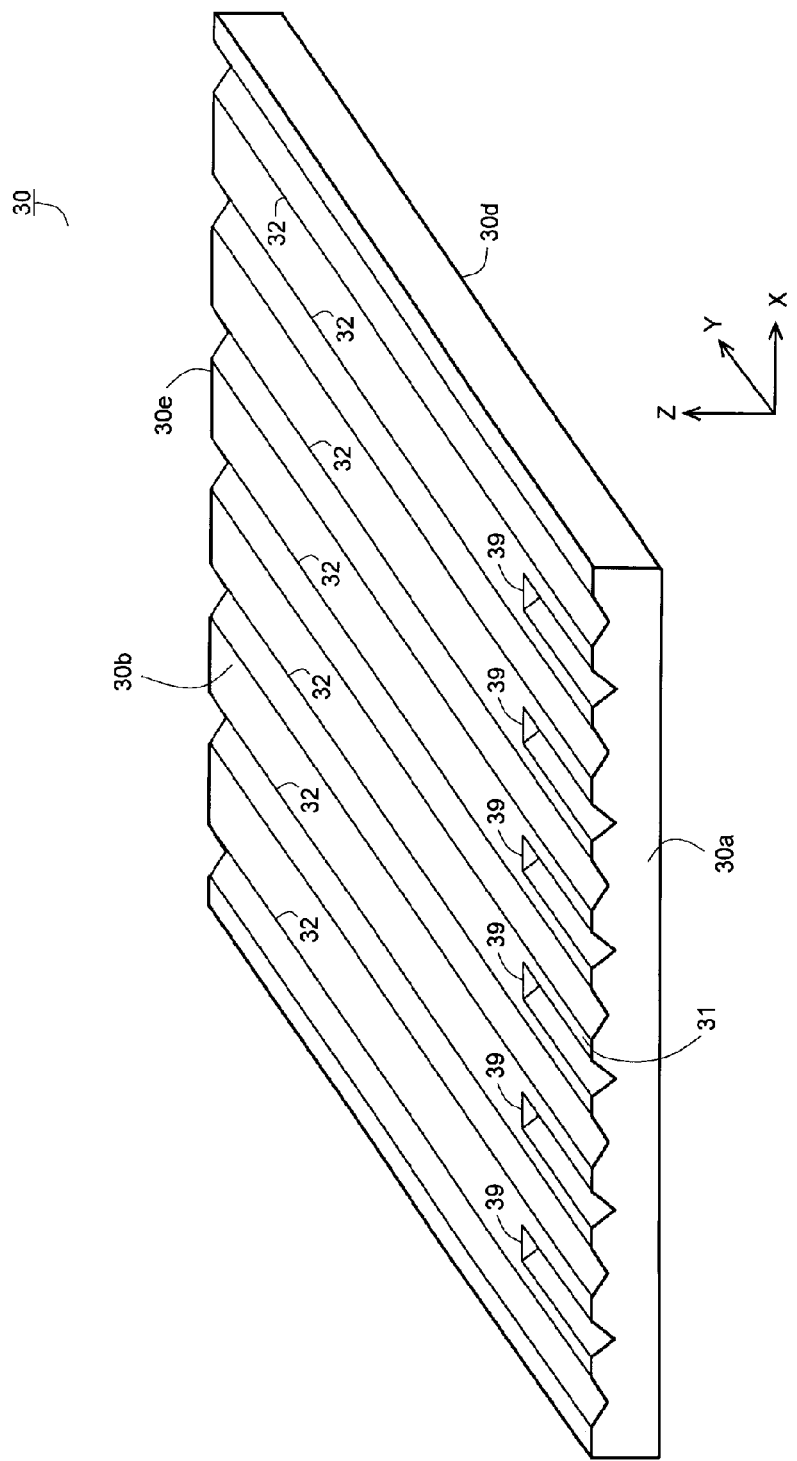
FIG. 3 is a perspective view showing the light guide plate in the illumination device of the display device of Embodiment 1 of the present invention.
Figure 4:
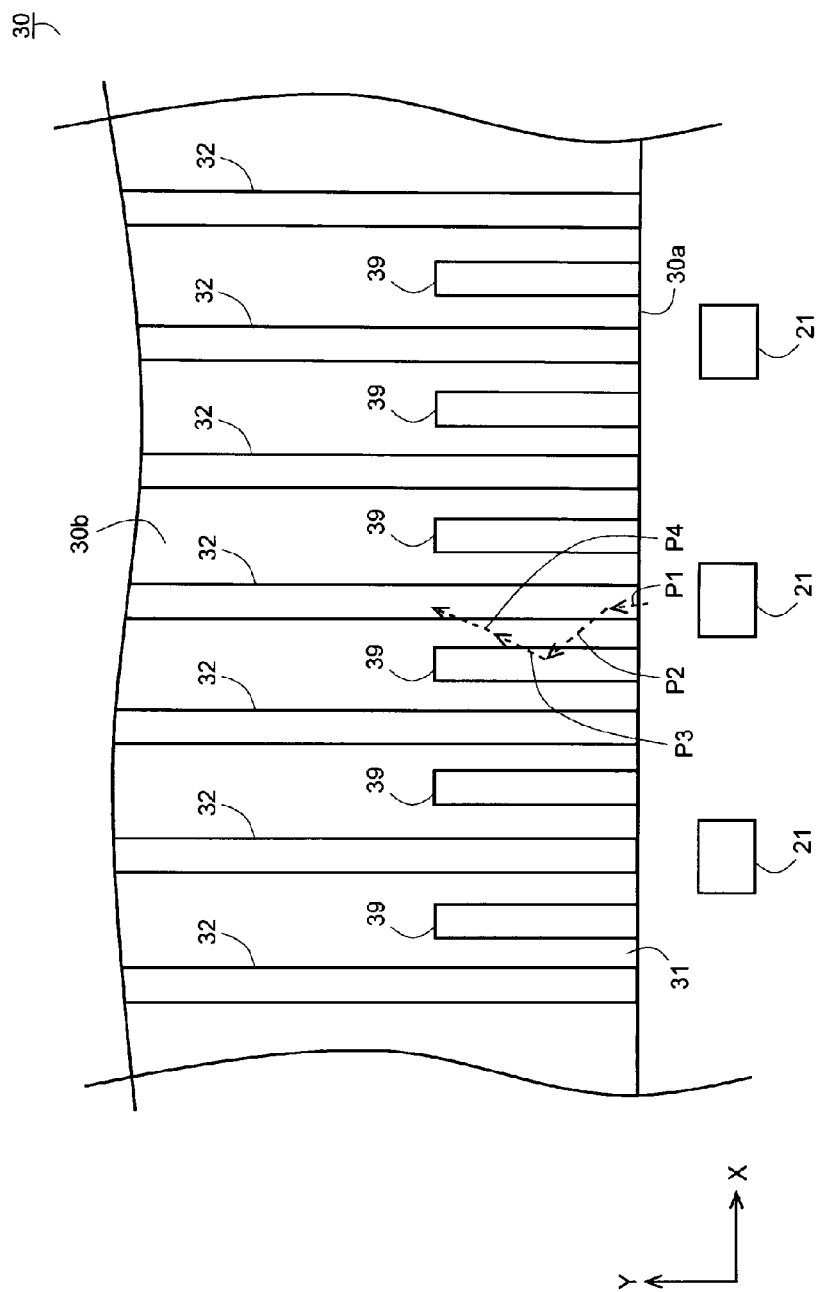
FIG. 4 is a plan view showing the light guide plate in the illumination device of the display device of Embodiment 1 of the present invention.

FIGS. 3 and 4 show a perspective view and a plan view of the light guide plate 30. On the light emitting surface 30b of the light guide plate 30, a flat portion 31 that is parallel to the X-Y plane, a plurality of prisms 32 (first concave prisms), and a plurality of prisms 39 (second concave prisms) are formed to be recessed from the flat portion 31. In other words, the prisms 32 and 39 are recessed from the front surface of the light guide plate 30. Alternatively, the prisms 32 and 39 may be recessed from the rear surface 30d of the light guide plate 30.

The prisms 32 and 39 are arranged along the lengthwise direction (X direction) of the light receiving face 30a, and the flat portion 31 is disposed between the prisms 32 and 39. The prism 32 is formed across the gap between the light receiving face 30a and the opposing face 30e opposite to the light receiving face 30a. The prism 39 is formed in a prescribed area in a vicinity of the light receiving face 30a between the adjacent prisms 32. Due to this, the length of the prisms 39 in the optical axis direction (Y direction) of the light sources 21 is shorter than the length of the light source 21 of the prism 32 in the optical axis direction (Y direction). An area facing the non-display area NA (see FIG. 2) of the light emitting surface 30b can be set as the prescribed area, for example.

Figure 5:
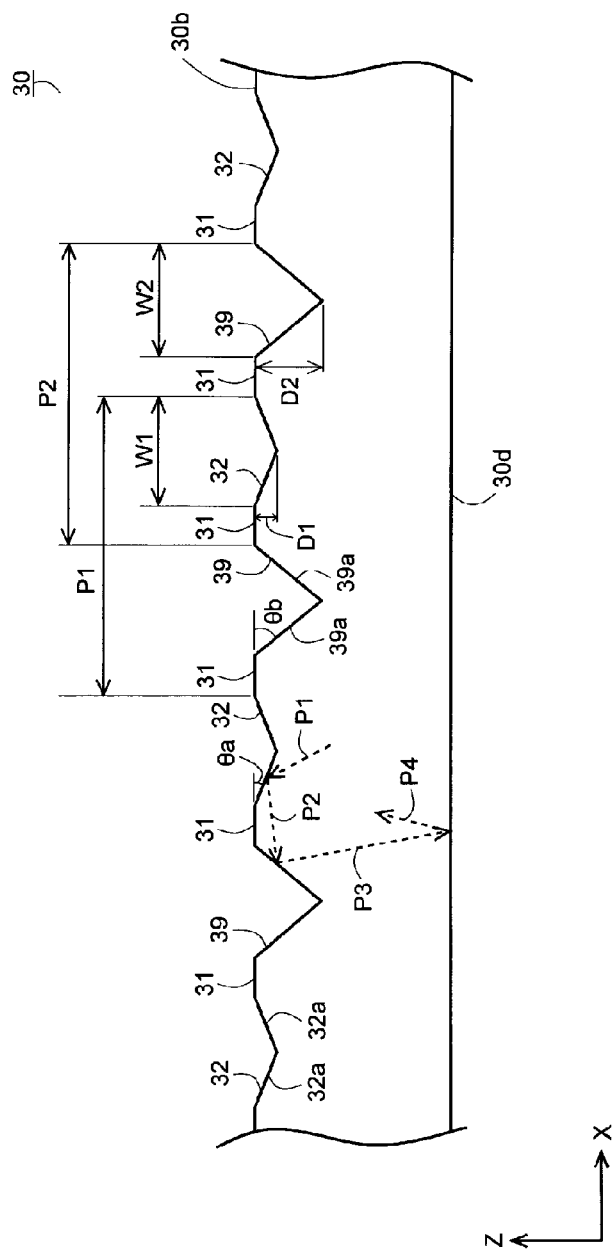
FIG. 5 is a cross-sectional view showing the cross section parallel to the light receiving face of the light guide plate in the illumination device of the display device of Embodiment 1 of the present invention.

FIG. 5 shows a cross-sectional view of the cross section parallel to the light receiving face 30a of the light guide plate 30. The respective prisms 32 have two inclined faces 32a that are formed of flat surfaces, and the two inclined faces 32a are inclined such that they come closer to each other as they approach the rear surface 30d away from the flat portion 31. Also, the respective prisms 39 have two inclined faces 39a that are formed of flat surfaces, and the two inclined faces 39a are inclined such that they come closer to each other as they approach the rear surface 30d from the flat portion 31. As a result, the cross-sectional shapes (cross-sectional shape parallel to the lengthwise direction of the light receiving face 30a) of the prisms 32 and 39 are substantially triangular.

The prisms 32 are formed to be at a prescribed depth D1 in the Z direction from the flat portion 31 and a prescribed width W1 in the X direction, and are arranged in the X direction at a pitch P1. The depth D1 is approximately 10 μm, the width W1 is approximately 25 μm, and the pitch P1 is approximately 70 μm, for example.

The prisms 39 are formed to be at a prescribed depth D2 in the Z direction from the flat portion 31 and a prescribed width W2 in the X direction, and are arranged in the X direction at a pitch P2. At this time, the depth D2 of the prism 39 in the Z direction is greater than the depth D1 of the prism 32 in the Z direction. The depth D2 is approximately 30 μm, the width W2 is approximately 25 μm, and the pitch P2 is approximately 70 μm, for example.

The base angle $\theta b$ of the prism 39 (inclination angle of the inclination face 39a in respect to the flat portion 31) is greater than the base angle $\theta b$ of the prism 32 (inclination angle of the inclination face 32a to the flat portion 31). There are no limits to the base angles $\theta a$ and $\theta b$, but it is preferable that the base angles $\theta a$ and $\theta b$ be set such that the angles satisfy the following condition: $5°<\theta b-\theta a<30°$. Furthermore, if the depth D2 of the prism 39 is greater than the depth D1 of the prism 32, the bottom angle $\theta a$ of the prism 32 may be equal to the bottom angle $\theta b$ of the prism 39. Even in this case, as will be described later, a portion of the light from the light source 21 that reaches the prism 32 and is reflected by the prism 32 is reflected by the prism 39 and is returned to the area that faces the light source 21.

In the illumination device 20 of the display device 1 with the above-mentioned configuration, the light emitted from the light sources 21 enters the light guide plate 30 through the light receiving face 30a. The light that has entered the light guide plate 30 is guided by being reflected by the light emitting surface 30b and the rear surface 30d of the light guide plate 30. The light P1 (see FIGS. 4 and 5) that reaches the prism 32 by being guided by the light guide plate 30 in the vicinity of the light receiving face 30a is reflected by the inclined face 32a of the prism 32. As a result, light entering the light guide plate 30 from a plurality of light sources 21 that are LEDs that perform point emission can be diffused in the X direction.

At this time, the depth D2 of the prism 39 is greater than the depth D1 of the prism 32. As a result, a portion P2 of the light reflected by the prism 32 is incident on the inclined face 39a of the prism 39. The light P3 reflected by the inclined face 39a is reflected by the rear surface 30d or the reflective member 24 (see FIG. 2). Then, the light P4 that is reflected by the rear surface 30d or the reflective member 24 travels towards the area facing the light source 21 where the light P1 was emitted.

A portion of the light that is reflected by the prism 32 is reflected by the prism 39 and returns to the area facing the light source 21 that emitted the light. As a result, the concentration of light between the light sources 21 in the vicinity of the light receiving face 30a can be reduced, and thus the occurrence of a bright line (V-shaped bright line) with high luminance in the vicinity of the light receiving face 30a can be suppressed. Therefore, unevenness in the illumination light emitted by the light emitting surface 30b can be reduced. At this time, the prisms 39 are formed in a prescribed area in the vicinity of the light receiving face 30a between the adjacent prisms 32. As a result, the light that returns to the area facing the light source 21 is less in amount in areas at a distance from the vicinity of the light receiving face 30a compared to the area in the vicinity of the light receiving face 30a. Therefore, the occurrence of a bright line (line-shaped bright line) that forms in a line shape along the optical axis direction (Y direction) of the light source 21 can be suppressed. In fact, a V-shaped bright line is unlikely to form in an area that is at a distance from the vicinity of the light receiving face 30a of the light guide plate 30, and therefore, there is no problem in particular even if there are no prisms 39 away from the vicinity of the light receiving face.

The light guide plate 30 guides the light towards a direction (Y direction) away from the light receiving face 30a and is repeatedly reflected, and light with a smaller incident angle than the critical angle that is incident on the light emitting surface 30b is emitted. As a result, the illumination light is diffused in the optical axis direction (Y direction) and the lengthwise direction of the light receiving face 30a (X direction) and is emitted from the light emitting surface 30b.

The directivity angle of illumination light that is emitted from the light guide plate 30 is narrowed by the prism sheet 23 to a direction perpendicular to the edge line, and is then radiated to the display panel 10. An image is displayed on the display panel 10 by the illumination light traveling through desired pixels of the display panel.

Figure 6:
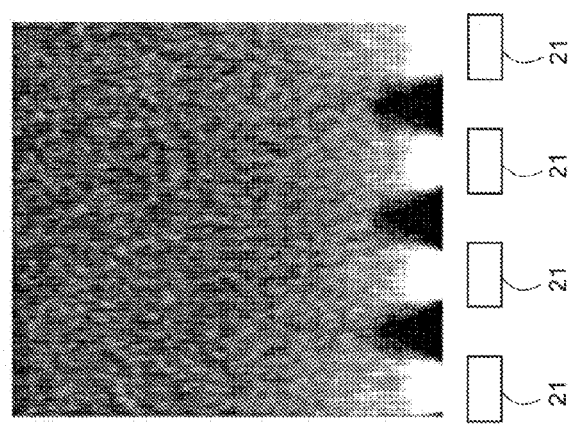
FIG. 6 shows the luminance distribution of the light emitted from the light guide plate in the illumination device of the display device of Embodiment 1 of the present invention.
Figure 7:
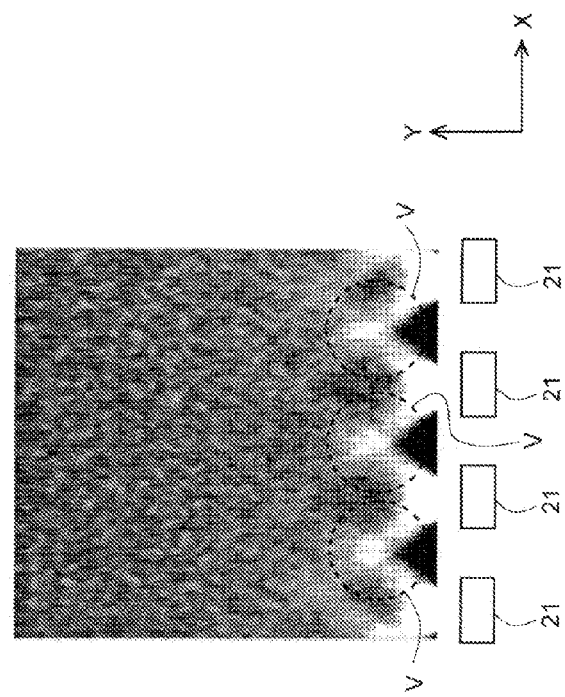
FIG. 7 shows the luminance distribution of the light emitted from a light guide plate of a comparison example for comparison with the illumination device of the display device of Embodiment 1 of the present invention.

Here, the effect of suppressing the V-shaped bright line by the prisms 39 is confirmed through simulation. The comparison example is a configuration that is the same as the present embodiment except for the lack of prisms 39. FIGS. 6 and 7 show the luminance distribution of the light emitted by the light guide plate 30 of the present embodiment and the comparison example. The V-shaped bright line V (area surrounded by broken lines) was perceived in the comparison example, but the V-shaped bright line was not perceived in the present embodiment.

As a result, it was found that the occurrence of the V-shaped bright line V is suppressed by forming the prisms 39 in the light guide plate 30, and that unevenness in the brightness of the illumination light emitted from the light emitting surface 30b is reduced.

According to the present embodiment, the light guide plate 30 has the plurality of prisms 32 (first concave prisms) and the plurality of prisms 39 (second concave prisms) that are recessed from the front surface or the rear surface 30d and that are aligned along the lengthwise direction of the light receiving face 30a. Also, the prisms 32 extend across the light receiving face 30a and the opposing face 30e opposite to the light receiving face 30a, and the prisms 39 are formed to be deeper than the prisms 32 in the prescribed area that is in the vicinity of the light receiving face 30a, the prisms 39 respectively being formed between adjacent prisms 32.

As a result, a portion of the light from the light source 21 in the vicinity of the light receiving face 30a reaches the prisms 32, is reflected by the prisms 32, is reflected by the prisms 39, and then returns to the respective areas facing the light sources 21. Therefore, a bright line (V-shaped bright line) with high luminance can be prevented from occurring in the light emitting surface 30b between the light sources 21 that are adjacent. As a result, the uniformity of the luminance of the illumination light emitted from the light emitting surface 30b can be improved.

Furthermore, because the prisms 39 are formed in the prescribed area in the vicinity of the light receiving face 30a between the adjacent prisms 32, the occurrence of a V-shaped bright line in the vicinity of the light receiving face 30a can be suppressed without forming prisms 39 across the light receiving face 30a and the opposing face 30e. As a result, the manufacturing steps of the illumination device 20 can be reduced. Therefore, the manufacturing cost of the illumination device 20 can be reduced.

Furthermore, the base angle θb of the prism 39 is greater than the base angle θa of the prism 32, and thus, the depth D2 of the prism 39 can be easily deepened so as to be greater than the depth D1 of the prism 32 without widening the width W2 of the light receiving face 30a of the prism 39 in the lengthwise direction (X direction). Therefore, the illumination device 20 can be easily reduced in size.

Figure 8:
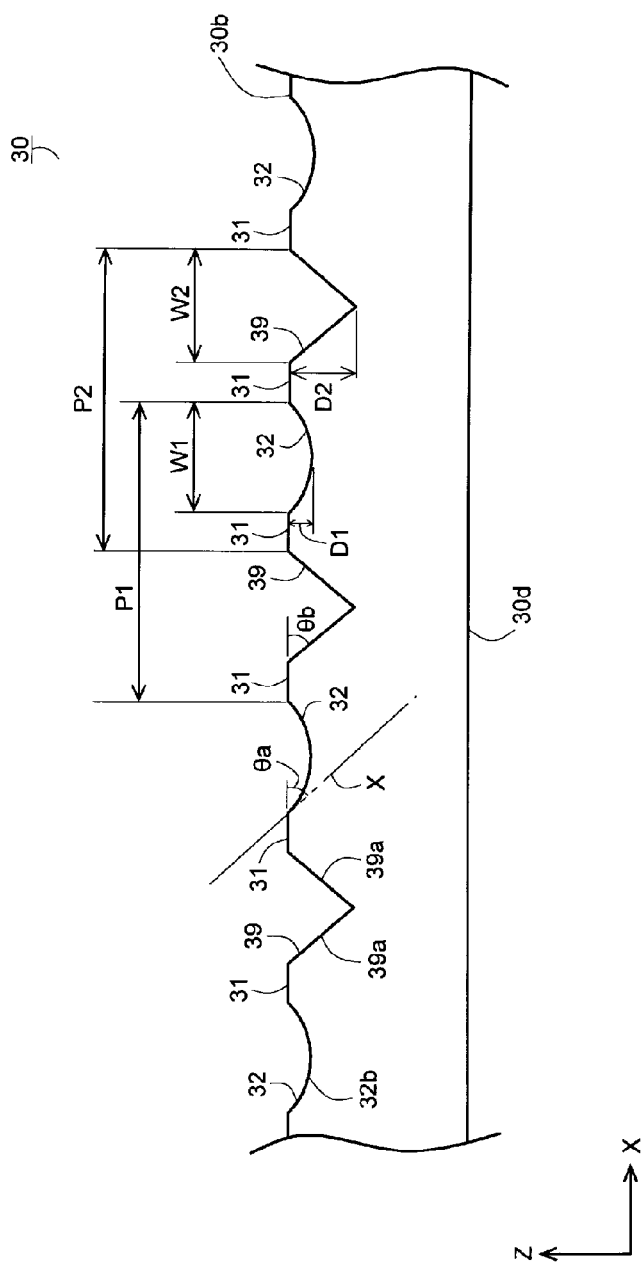
FIG. 8 is a cross-sectional view showing the cross section parallel to the light receiving face of a light guide plate in an illumination device of a display device of Embodiment 2 of the present invention.

Next, Embodiment 2 of the present invention will be described. FIG. 8 shows a cross-sectional view that is parallel to a light receiving face 30a of a light guide plate 30 in an illumination device 20 of a display device 1 of the present embodiment. For convenience of explanation, parts that are similar to those of the aforementioned FIGS. 1 to 5 in Embodiment 1 are assigned the same reference characters. The cross-sectional shape of the prism 32 (first prism) in the present embodiment is different from that of the first embodiment. The remaining parts are similar to Embodiment 1.

The bottom portion 32b of the prism 32 is formed so as to have a curved surface. As a result, the cross-sectional shape of the prism 32 in a direction parallel to the lengthwise direction (X direction) of the light receiving face 30a is formed in a curve. The base angle θa of the prism 32 is the angle with respect to the plane X that passes through the intersecting line between the prism 32 and a flat portion 31 and that touches the curved surface of the prism 32.

According to the present embodiment, it is possible to attain effects similar to those of Embodiment 1. Furthermore, the cross-sectional shape of the prism 32 in a direction parallel to the lengthwise direction (X direction) of the light receiving face 30a is formed in a curve. As a result, compared to a case in which an inclined faces 32a of the prism 32 are formed as a flat surface as in Embodiment 1, the surface area of the bottom portion 32 can be enlarged without changing the depth D1 of the prism 32. Therefore, the prism 32 can more reliably diffuse the light guided in the lengthwise direction of the light receiving face 30a.

Figure 9:
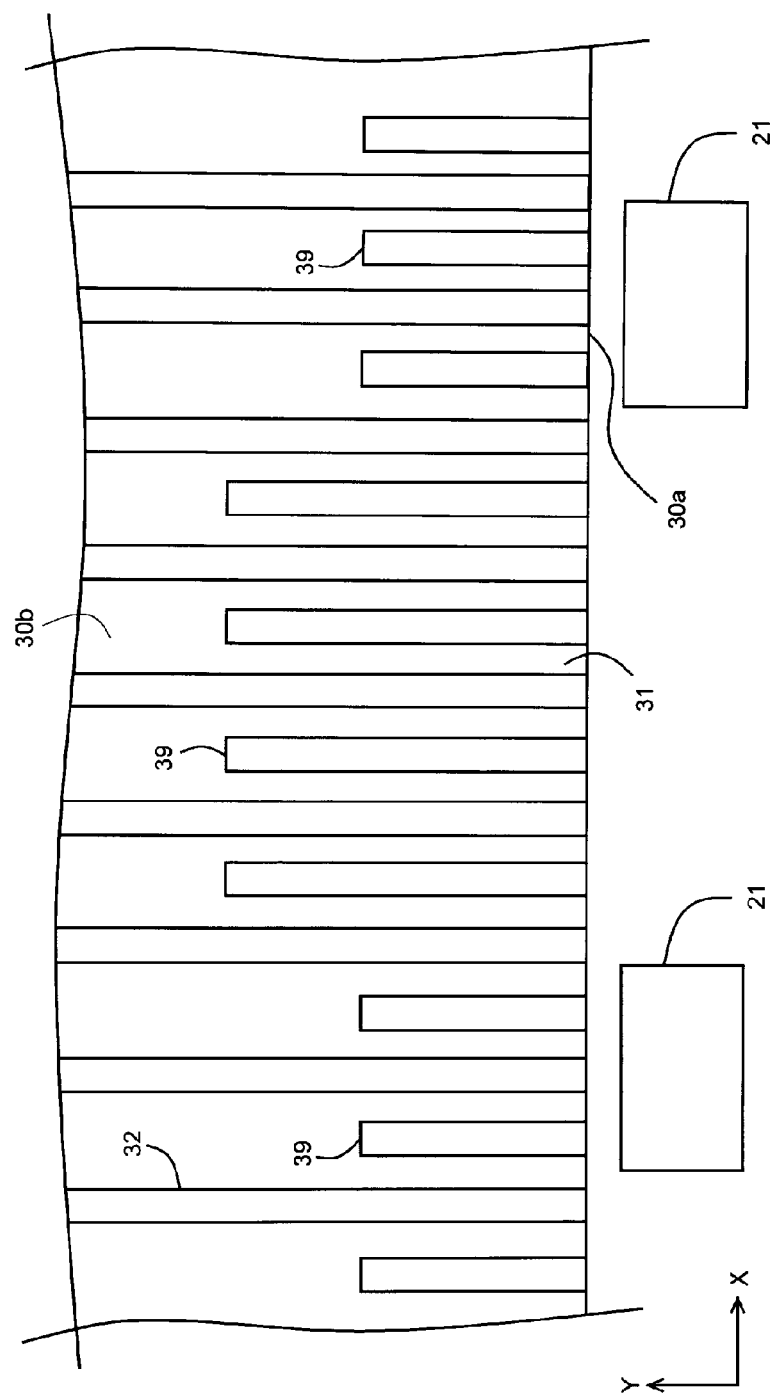
FIG. 9 is a plan view of a light guide plate in an illumination device of a display device of Embodiment 3 of the present invention.

Next, Embodiment 3 of the present invention will be described. FIG. 9 shows a plan view of a light guide plate 30 in an illumination device 20 of a display device 1 of the present embodiment. For convenience of explanation, the parts that are similar to those of the aforementioned FIGS. 1 to 5 in Embodiment 1 are assigned the same reference characters. The present embodiment is different from Embodiment 1 in that the length of some prisms 39 (second concave prisms) is shorter than the length of other prisms 39. The remaining parts are similar to Embodiment 1.

In portions of the light guide plate 30 in the vicinity of the light receiving face 30a in areas between the light sources 21, the light from one of the light sources 21 reaches the prism 32 and is reflected by the prism 32 such that the light spreads in the lengthwise direction of the light receiving face 30a (X direction) and overlaps the light from another of the light sources 21 that reaches the prism 32 and is reflected by the prism 32 such that the light spreads in the lengthwise direction of the light receiving face 30a (X direction). As a result, many V-shaped bright lines can easily occur. As for this point, according to the present embodiment, the length, in the optical axis direction of the light sources 21, of the prisms 39 facing the light sources 21 is shorter than the length, in the optical axis direction of the light sources 21, of the prisms 39 disposed between the adjacent light sources 21. As a result, the length, in the optical axis direction of the light sources 21, of the prisms 39 disposed between the adjacent light sources 21 is greater than the length, in the optical axis direction of the light sources 21, of the prisms 39 facing the light sources 21. Therefore, the light converging between the light sources 21 by the prisms 32 can be more reliably returned to the area facing the light source 21. As a result, unevenness in the brightness of the illumination light emitted by the light emitting surface 30b can be even more reliably reduced.

Furthermore, the number of manufacturing steps can be reduced because the length, in the optical axis direction of the light sources 21, of the prisms 39 facing the light source 21 can be made shorter. Therefore, the manufacturing cost of the illumination device 20 can be reduced.

Alternatively, in Embodiment 3, the depth of the prisms 39 facing the light source 21 may be shallower than that of the prisms 39 disposed between the adjacent light sources 21. A similar effect can be obtained in this case as well.

Figure 10:
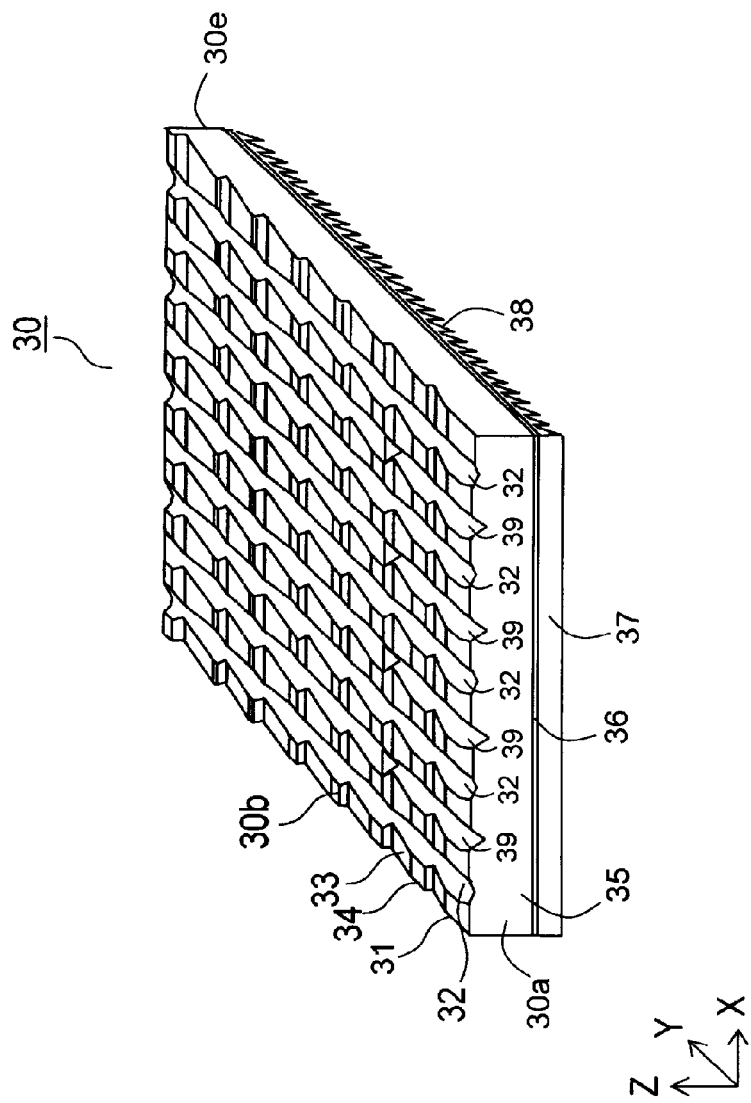
FIG. 10 is a perspective view of a light guide plate in an illumination device of a display device of Embodiment 4 of the present invention.
Figure 11:
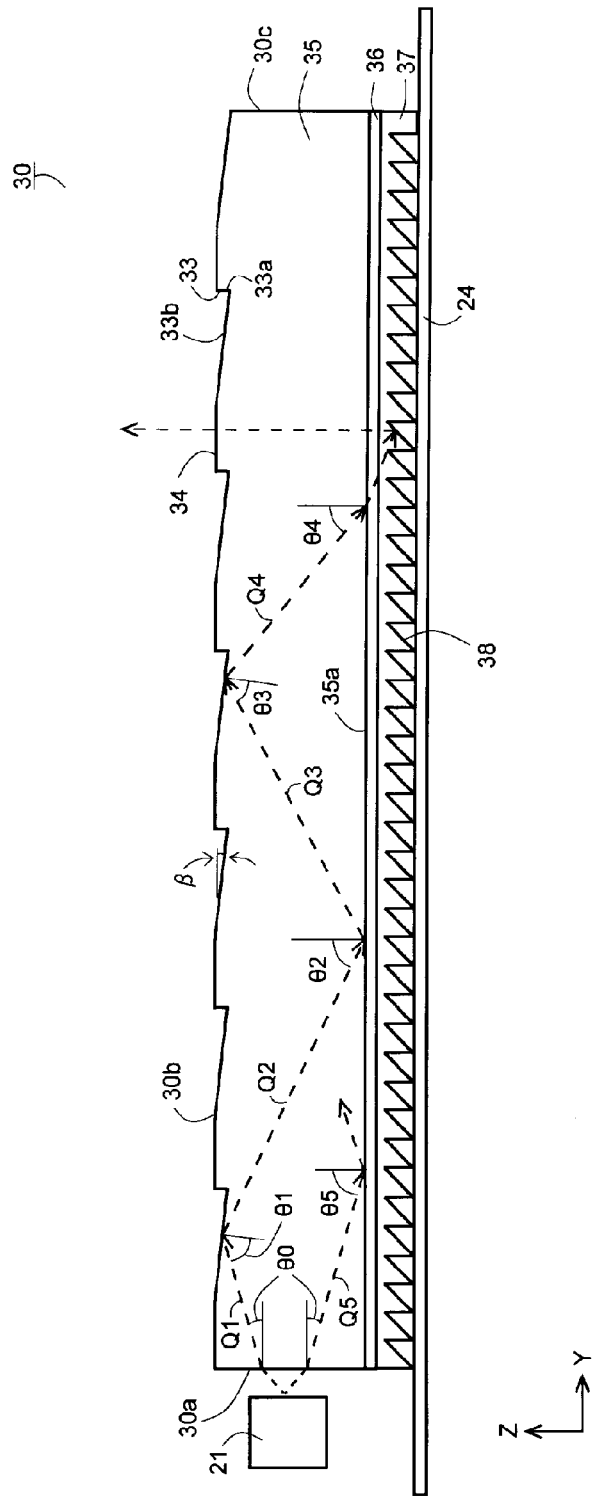
FIG. 11 is a cross-sectional view showing the cross section that is perpendicular to the light receiving face of the light guide plate in the illumination device of the display device of Embodiment 4 of the present invention.

Next, Embodiment 4 of the present invention will be described. FIG. 10 shows a perspective view of a light guide plate 30 in an illumination device 20 of the present embodiment. FIG. 11 is a cross-sectional view of the light guide plate 30 along a direction perpendicular to the light receiving face 30a thereof. For convenience of explanation, the parts that are similar to those of the aforementioned FIGS. 1 to 5 in Embodiment 1 are assigned the same reference characters. The configuration of the present embodiment is different from Embodiment 1 in that the light guide plate 30 does not have a prism sheet 23 (see FIGS. 1 and 2). The rest of the parts are similar to Embodiment 1.

The light guide plate 30 has a light guide portion 35, a low refractive index layer 36, and a condensing portion 37, which are stacked in the Z direction. The light guide portion 35 is formed of a transparent resin or the like such as acrylic or polycarbonate. Also, the light guide portion 35 has a light receiving face 30 and a light emitting surface 30b, and guides light that has entered from the light sources 21.

It is preferable that the refractive index n1 of the light guide portion 35 be greater than or equal to 1.42, and it is even more preferable that it be 1.59 to 1.65. If the light guide portion 35 is formed of acrylic, the refractive index n1 can be approximately 1.49. Alternatively, if the light guide portion 35 is formed of polycarbonate, the refractive index n1 can be approximately 1.59. If the light guide portion 35 is formed of acrylic, the light transmission can be improved compared to a case in which the light guide portion 35 is formed of polycarbonate.

Flat portions 31 and prisms 32 and 39 are provided on the light emitting surface 30b of the light guide portion 35 in the X direction, and the flat portions 31 are provided between the prisms 32 and the prisms 39. A plurality of prisms 33 (third concave prisms) that extend in the X direction are provided on the flat portions 31 so as to be aligned in the Y direction. As a result, a plurality of prisms 33 are disposed between the prisms 32 and the prisms 39.

Between the adjacent prisms 33, a horizontal surface 34 that is parallel to the X-Y plane is provided. The horizontal surface 34 may be removed by forming prisms 33 continuously. The flat portion 31 is formed on the horizontal surface 34 and on the prisms 33 so as to be flat in the X direction.

The prism 33 has a perpendicular face 33a that is perpendicular to the X-Y plane and an inclined face 33b (first inclined face) that is inclined within the Y-Z plane. The inclined face 33b is inclined towards the low refractive index layer 36 the farther away it is from the light receiving face 30a, and has a prescribed inclination angle β with respect to the direction (Y direction) perpendicular to the light receiving face 30a. It is preferable that the inclination angle β be less than or equal to 5°, and it is even more preferable that the inclination angle be 0.1° to 3°. Furthermore, it is preferable that the length of the inclined face 33b be less than or equal to 0.25 mm in the Y direction, and it is even more preferable that it be 0.01 mm to 0.10 mm.

The low refractive index layer 36 is adjacent to the rear surface 35a of the light guide portion 35 and the refractive index of the low refractive index layer 36 is lower than that of the light guide portion 35. The low refractive index layer 36 is formed of a fluorinated acrylate, a resin or the like including hollow particles such as nano-sized inorganic fillers or the like. It is preferable that the refractive index n2 of the low refractive index layer 36 be less than 1.42, and it is even more preferable that the refractive index be 1.10 to 1.35. Furthermore, it is preferable that the relationship, n1/n2>1.18, holds true between the refractive index n1 of the light guide portion and the refractive index n2 of the low refractive index layer 36.

If the low refractive index layer 36 is formed of fluorinated acrylate, the refractive index n2 can be approximately 1.35. If the low refractive index layer 36 is formed of a resin including hollow particles, the refractive index n2 can be less than or equal to 1.30.

The condensing portion 37 is adjacent to the low refractive index layer 36 and has a refractive index greater than or equal to that of the low refractive index layer 36. Therefore, the condensing portion 37 may be formed of the same material as the low refractive index layer 36.

Figure 12:
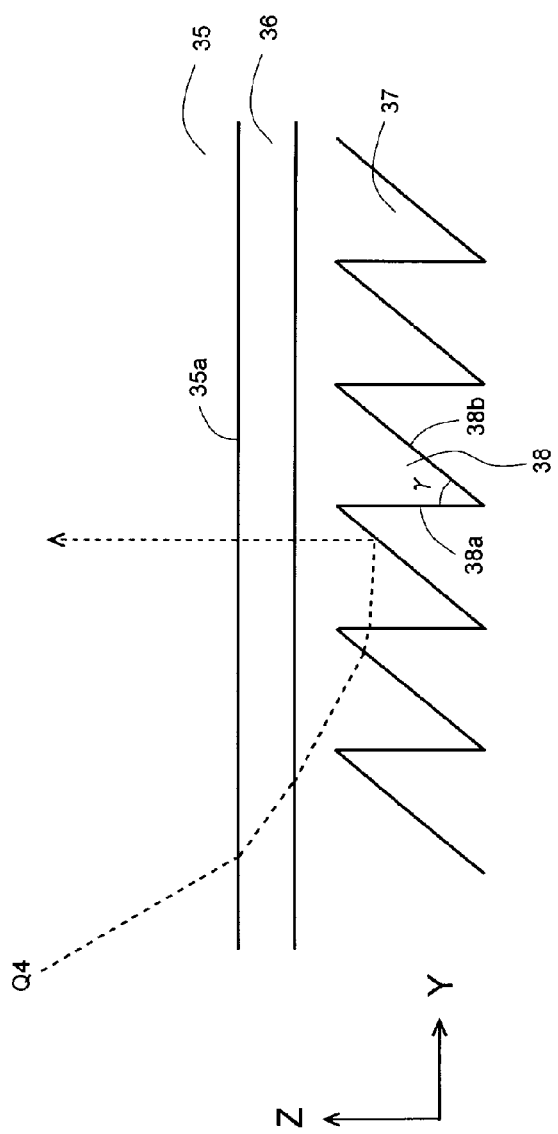
FIG. 12 is a cross-sectional view showing the cross section that is perpendicular to the light receiving face of the condensing portion of the light guide plate in the illumination device of the display device of Embodiment 4 of the present invention.

A plurality of prisms 38 (fourth concave prisms) that extend in the X direction are provided on the rear surface of the condensing portion 37 so as to be aligned in the Y direction. FIG. 12 is a cross-sectional view of the condensing portion 37 in a direction perpendicular to the light receiving face 30a thereof. The prisms 38 respectively have perpendicular faces 38a that are perpendicular to the X-Y plane and inclined faces 38b (second inclined face) that are inclined within the Y-Z plane. The inclined face 38b is farther inclined towards the low refractive index layer 36 in areas farther away from the light receiving face 30a, and has a prescribed inclination angle γ relative to the Z direction.

The length of the inclined face 38b in the Y direction is less than or equal to approximately 0.1 mm, and it is preferable that the length be between approximately 0.01 mm to approximately 0.025 mm. The inclination angle γ is a vertex of the prism 38, and it is preferable that the angle be 40° to 50°. Furthermore, the vertical face 38a is formed so as to be inclined with respect to the Y direction. At this point, it is preferable that the vertex of the prism 38 be 40° to 50°.

In the display device 1 of the above-mentioned configuration, the intensity of the light emitted from the light sources 21 is highest in the front direction of the light source 21 (Y direction), and the light spreads in the X direction and the Z direction relative to the front direction (Y direction). The light emitted from the light sources 21 refracts when the light is incident on the light receiving face 30a of the light guide portion 35. The refraction angle at this time is θ0, and if the critical angle between the light guide portion 35 and the air is $\phi_1$, then θ0<$\phi_1$. $\phi_1$ is arcsin(1/n1), and if n1=1.59, then $\phi_1$=39°, for example. In other words, the beam spread angle is ±$\phi_1$ in the X direction and the Z direction with respect to the Y direction of the light received from the light receiving face 30a.

The light that entered from the light receiving face 30a of the light guide portion 35 is reflected between the light emitting surface 30b and the rear surface 35a and is then guided. The light traveling to the light emitting surface 30b from the light receiving face 30a is incident on the horizontal face 34 or the inclined face 33b. The incident angle of the light that is incident on the horizontal face 34 is greater than or equal to 90°−$\phi_1$. The incident angle θ1 of the light Q1 that is incident on the inclined face 33b is greater than or equal to 90°−$\phi_1$−β.

At this time, the light that has entered the light emitting surface 30b at a smaller incident angle than the critical angle $\phi_1$ is emitted from the light receiving face 30b and the light that has entered at an incident angle greater than the critical angle $\phi_1$ is completely reflected. The light Q2 reflected by the inclined face 33b is incident on the rear surface 35a with the incident angle θ2. The incident angle θ2 is greater than or equal to 90°−$\phi_1$−2·β. At this time, the light that has entered the rear surface 35a at an incident angle smaller than a critical angle $\phi_2$ between the light guide portion 35 and the low refractive index layer 36 is incident on the low refractive index layer 36. Furthermore, the light that is incident on the rear surface 35a with a greater incident angle than the critical angle $\phi_2$ is completely reflected. The critical angle $\phi_2$=arcsin(n2/n1), and if n1=1.59 and n2=1.35, then $\phi_2$=58°, for example.

The light Q3 reflected at the rear surface 35a is incident on the light emitting surface 30b. At this time, the incident angle of the light that is incident on the horizontal face 34 is θ2, and the incident angle of the light entering the inclined face 33b is greater than or equal to 90°−$\phi_1$−3·β. As mentioned above, the light that has entered the light emitting surface 30b at an incident angle smaller than the critical angle $\phi_1$ is emitted from the light emitting surface 30b and the light that has entered at an incident angle greater than the critical angle $\phi_1$ is completely reflected.

At this time, the light Q4 reflected by the inclined face 33b is incident on the rear surface 35a with the incident angle θ4. The incident angle θ4 is greater than or equal to 90°−$\phi_1$,−4·β. Furthermore, the light that has entered the rear surface 35a at an incident angle smaller than the critical angle $\phi_2$ is incident on the low refractive index layer 36, but the light that has entered the rear surface 35a at an incident angle greater than the critical angle $\phi_2$ is completely reflected.

In other words, the incident angle of light at the light emitting surface 30b and the rear surface 35a of the light that the light guide portion 35 guides through the inclined face 33b reflecting the light becomes gradually smaller. Then, the incident angle of the interface between the light guide portion 35 and the low refractive index layer 36 becomes gradually smaller in increments of 2·β, and when the angle becomes smaller than the critical angle $\phi_2$, the light is incident on the low refractive index layer 36. As a result, the range of the incident angle of the light entering the low refractive index layer 36 from the light guide portion 35 is $\phi_2$ to $\phi_2$−2·β.

The light that is incident on the low refractive index layer 36 travels through the low refractive index layer 36 and is incident on the condensing portion 37. At this time, the refractive index n3 of the condensing portion 37 is greater than or equal to the refractive index n2 of the low refractive index layer 36, and thus complete reflection does not occur at the interface between the low refractive index layer 36 and the condensing portion 37.

The light that is incident on the condensing portion 37 is incident on the inclined face 38b (see FIG. 12) of the prism 38. If the light is incident on the inclined face 38b at an incident angle greater than the critical angle $\phi_3$ between the condensing portion 37 and air, then the light is completely reflected in the direction towards the light emitting surface 30b. The critical angle $\phi_3$=arcsin(1/n3). If n1=n3=1.59, then $\phi_3$=39° and if n1=1.59 and n2=n3=1.35, then $\phi_3$=48°, for example.

Light that has entered the inclined face 38b at an inclined angle smaller than the critical angle $\phi_3$ is refracted and emitted through the condensing portion 37, and then, the light is refracted and is incident on the condensing portion 37 of the vertical face 38a again. As a result, as the light is repeatedly emitted and received to and from the condensing portion 37, the incident angle of light at the inclined face 38b becomes gradually larger as the light is refracted, and thus, the light is completely reflected by the inclined face 38b.

The light reflected by the inclined face 38b is emitted from the light emitting surface 38b. As a result, the directivity angle of the light emitted from the light emitting surface 30b can be narrowed in the direction (Y direction) that is perpendicular to the edge lines of the prisms 33 and 38.

Furthermore, in FIG. 11, the light Q5 that travels from the light receiving face 30a towards the rear surface 35a of the light guide portion 35 is similarly incident on the low refractive index layer 36 after repeatedly being reflected between the light emitting surface 30b and the rear surface 35a. Furthermore, the light reflected off of the inclined face 38b of the prism 38 is emitted from the light emitting surface 30b.

As mentioned above, the incident angle of the light guided by the light guide portion 35 with respect to the low refractive index layer 36 becomes gradually smaller in increments of 2·β and the light incident on the low refractive index layer 36 is emitted from the light emitting surface 30b.

As a result, the amount of light emitted from the edge face 30c (see FIG. 11) opposite to the light receiving face 30a can be reduced.

As a result, even if the case 25 is formed of a light absorbing material, the light absorbed is less, and thus, a reduction in brightness of the illumination light in the vicinity of the case 25 can be prevented. Therefore, the case 25 can be made thinner and the frame of the illumination device 20 can be made narrower, and the illumination device 20 and the display device 1 can be reduced in size.

According to the present embodiment, an effect similar to that of Embodiment 1 can be attained. Furthermore, the prisms 32 and 39 (first and second concave prisms) are formed on the light emitting surface 30b, and because the prisms 33 (third concave prisms) are disposed between the prisms 32 and the prisms 39, the amount of light guided through the light guide plate 30 and incident on the light emitting surface 30b gradually becomes smaller, and the prisms 32 can diffuse the guided light.

Furthermore, because the light guide plate 30 includes the light guide portion 35, the low refractive index layer 36, and the condensing portion 37, and is provided with the inclined faces 38b on the side of the low refractive index layer 36 opposite to the light emitting surface 30b, the directivity angle of the light emitted from the light emitting surface 30b can be narrowed. Therefore, the prism sheet 23 (see FIGS. 1 and 2) is not necessary. Thus, the cost of the illumination device 20 and the display device 1 can be reduced.

In Embodiment 4, the prisms 33 may be provided in the interface between the light guide portion 35 and the low refractive index layer 36.

The prisms 32 and the prisms 39 are disposed alternatively in Embodiments 1 to 4, but the present invention is not limited thereto. Two prisms 39 may be disposed between two prisms 32, for example. In other words, the prisms 32 and 39 may be disposed such that a portion of the light that is reflected by the prisms 32 is reflected by the prisms 39 and can return to the area facing the light source 21.

Furthermore, the illumination device 20 may be used as an illumination apparatus that illuminates areas indoors or outdoors.

INDUSTRIAL APPLICABILITY

According to the present invention, the present invention can be used for a display device such as an illumination device having a light guide plate, an illumination device such as an illumination apparatus or the like, or a liquid crystal display device or the like using an illumination device.

DESCRIPTION OF REFERENCE CHARACTERS 1 display device
10 display panel
11 active matrix substrate
12 opposite substrate
13 polarizing film
20 illumination device
21 light source
23 prism sheet
23a prism
24 reflective member
25 case
30 light guide plate
30a light receiving face
30b light emitting surface
30d rear surface
30e opposing face
32 prism (first concave prism)
32a inclined face
33 prism (third concave prism)
33a, 38a perpendicular face
33b, 38b inclined face
34 horizontal face
35 light guide portion
36 low refractive index film
37 condensing portion
38 prism (fourth concave prism)
39 prism (second concave prism)
39a inclined face

What is claimed is:

1. An illumination device, comprising:
a plurality of light sources arranged in one direction; and
a light guide plate that has a side edge face as a light-receiving face facing the light sources and that guides light from the light sources received through the light-receiving face so as to emit illumination light from a light-emitting surface that is a front surface of the light guide plate,
wherein a plurality of first concave prisms and a plurality of second concave prisms are formed so as to be recessed from the front surface or a rear surface of the light guide plate, the first concave prisms and the second concave prisms being arranged along a lengthwise direction of the light-receiving face,
wherein the first concave prisms extend from the light-receiving face to a face of the light guide plate opposite to the light-receiving face, and the second concave prisms extend from the light-receiving face and are truncated in a prescribed area in a vicinity of the light-receiving face, the second concave prisms respectively being formed between adjacent said first concave prisms and recessed deeper than the first concave prisms, and
wherein a base angle of each of the second concave prisms is greater than a base angle of each of the first concave prisms.

2. The illumination device according to claim 1, wherein a cross-sectional shape of the first concave prisms along a direction parallel to said lengthwise direction of the light-receiving face is curved.

3. The illumination device according to claim 1,
wherein the plurality of second concave prisms comprises a plurality of second concave prisms respectively facing the light sources and a plurality of second concave prisms between the light sources, and
wherein a length, in an optical axis direction of the light sources, of the second concave prisms facing the light sources is shorter than a length in said optical axis direction of the second concave prisms between the light sources.

4. The illumination device according to claim 1,
wherein the plurality of second concave prisms comprises a plurality of second concave prisms formed in regions of the light guide plate respectively facing the light sources and a plurality of second concave prisms formed in regions of the light guide plate between said regions of the light guide plate facing adjacent said light sources, and
wherein the second concave prisms formed in regions of the light guide plate facing the light sources are shallower in depth than the second concave prisms formed in regions of the light guide plate between said regions of the light guide plate facing adjacent said light sources.

5. The illumination device according to claim 1, wherein the light sources have an optical axis that defines an optical axis direction, wherein the light guide plate has third concave prisms formed therein and arranged along the optical axis direction of the light sources, each of the third concave prisms having an inclined surface such that a point on said surface is closer to the rear surface of the light guide plate the farther away said point on said surface is from the light-receiving face, wherein the illumination device further comprises:
- a low refractive index layer having a lower refractive index than the light guide plate is disposed on the rear surface of the light guide plate; and
- a condensing portion having formed therein fourth concave prisms, the fourth concave prisms being arranged along the optical axis direction of the light sources, the condensing portion being formed on a rear surface of the low refractive index layer, each of the fourth concave prisms having an inclined surface such that a point on said surface becomes closer to the low refractive index layer the farther away said point on said surface is from the light-receiving face, and wherein the first concave prisms and the second concave prisms are formed in the light-emitting surface and the third concave prisms are formed between each first concave prism and each second concave prism.

6. A display device, comprising:

the illumination device according to claim 1; and a display panel disposed so as to face the light-emitting surface of the light guide plate.

* * * * *